Figure 1:
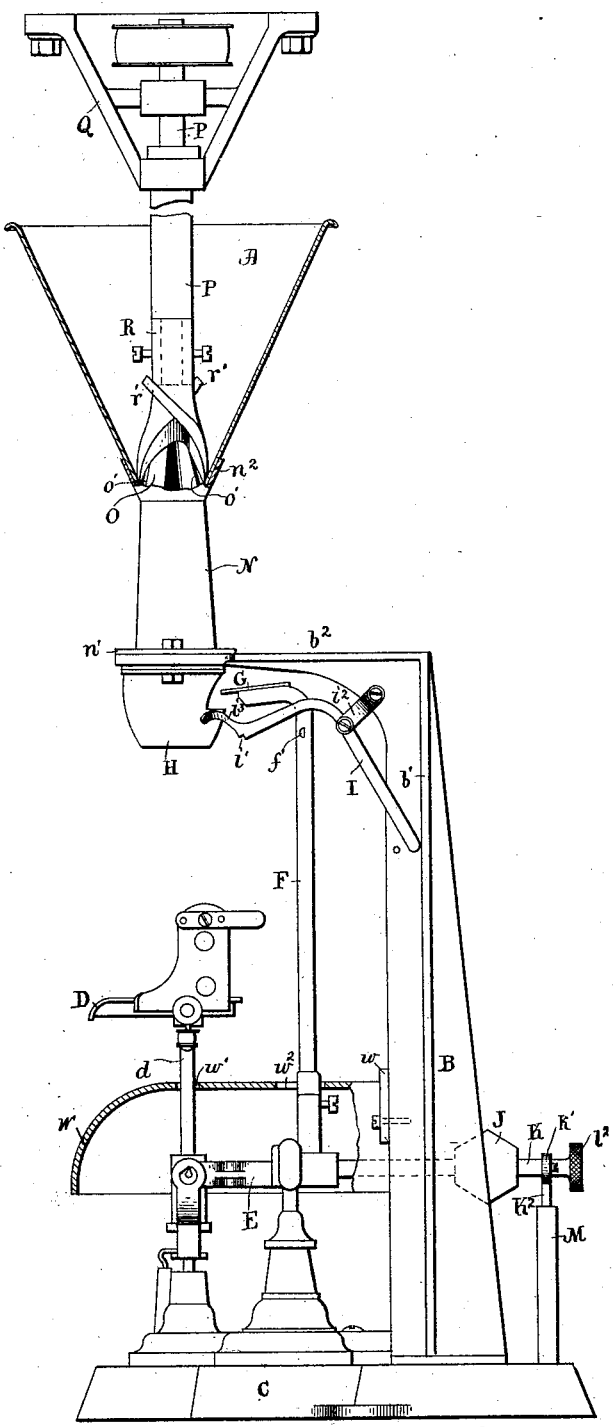

(No Model.)  2 Sheets—Sheet 1.

C. C. CLAWSON.
AUTOMATIC WEIGHING AND PACKAGE FILLING MACHINE.

No. 360,510.  Patented Apr. 5, 1887.

Attest:
Jas. K. McCattran
Geo. T. Smallwood.

Inventor:
Clement Coleridge Clawson,
By Chas. J. Hedrick
his atty.

(No Model.) 2 Sheets—Sheet 2.
C. C. CLAWSON.
AUTOMATIC WEIGHING AND PACKAGE FILLING MACHINE.
No. 360,510. Patented Apr. 5, 1887.
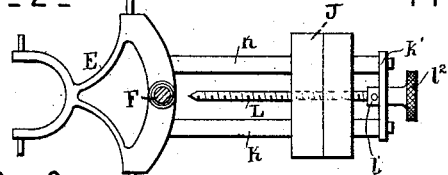
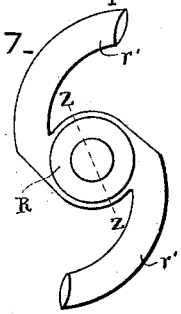
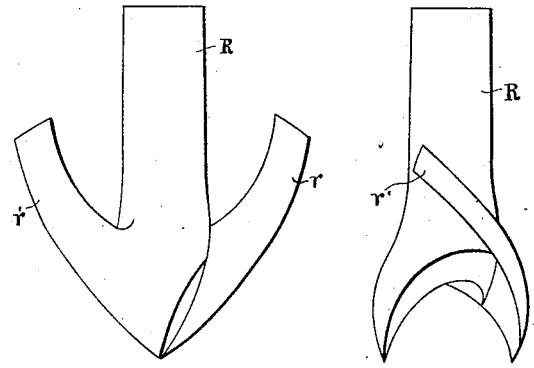
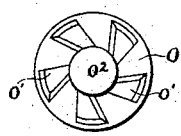
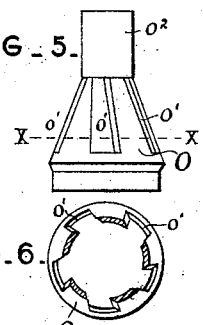
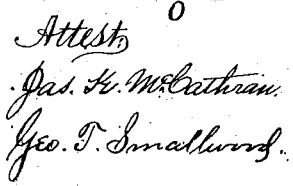
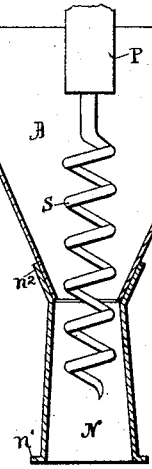
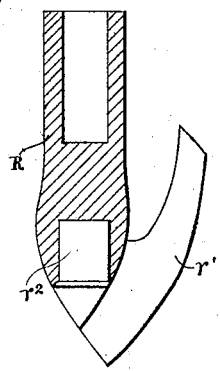
Attest:
Jas. K. McCathran.
Geo. T. Smallwood.
Inventor:
Clement Coleridge Clawson
By Chas. J. Hedrick
his Atty.
N. PETERS, Photo-Lithographer, Washington, D. C.

UNITED STATES PATENT OFFICE.

CLEMENT COLERIDGE CLAWSON, OF NEWARK, NEW JERSEY, ASSIGNOR, BY DIRECT AND MESNE ASSIGNMENTS, TO THE UNITED STATES MACHINE AND INVENTIONS COMPANY, OF NEW YORK.

AUTOMATIC WEIGHING AND PACKAGE-FILLING MACHINE.

SPECIFICATION forming part of Letters Patent No. 360,510, dated April 5, 1887.

Application filed October 18, 1886. Serial No. 216,561. (No model.) Patented in England February 6, 1886, No. 1,791.

*To all whom it may concern:*

Be it known that I, CLEMENT COLERIDGE CLAWSON, a citizen of the United States, residing at Newark, in the county of Essex and State of New Jersey, have invented certain new and useful Improvements in Automatic Weighing and Package-Filling Machines, (for which in part British Letters Patent No. 1,791, dated February 6, 1886, have been secured,) of which the following specification is a full, clear, and exact description.

This invention, although it may at least in part be otherwise applied, relates more particularly to those machines for putting up granular or pulverulent materials in packages of a given weight in which a box or case to be filled is placed on a weighing-scale and is supplied with the material until a sufficient quantity has been received to overbalance the scale, whereupon the delivery is automatically arrested by the closing of a supply-gate connected with the weighing-scale.

The first part of the invention consists in improved means for automatically locking the weighing mechanism when the supply-gate is closed. Heretofore (see my patents No. 266,951, dated October 31, 1882, and Nos. 315,729 and 315,730, dated April 14, 1885) a locking-latch has been employed which has been prevented from locking the weighing mechanism so long as the box or package remained on the scale-pan or package-support. This arrangement of the latch, although very convenient in many respects, is open to the objection that if the scale-pan be not held down while the package is removed the latch fails to lock the scale, and consequently the delivery proceeds, although there is no box to receive the material. In the present invention a latch not dependent for its action on the absence of the package from the scale is employed. It consists of a lever pivoted to the machine-frame above the weighing-scale and adapted to engage the rod which supports the supply-gate. This lever has a finger in close proximity to the delivery-spout, so that it can be lifted by the edge of the box or case in the act of placing the same on the scale, while at the same time it is such a distance above the plate which supports the box or case that it is out of contact with said box or case when the latter is set on the plate. In my Letters Patent No. 315,731, dated April 14, 1885 a locking-latch is described having a finger in proximity to a spout and adapted to be released by the pressure of the edge of a box or case to be filled through the said spout; but in that case the box or case is simply held in the hand, the spout is not that which supplies the weighing-scale, and the latch does not engage the rod which supports the supply-gate.

The second part of the invention consists in a weighing-scale having the scale-weight which balances the full package in the form of a slide, adjustable by means of a screw, instead of being, as heretofore, movable directly by hand. Preferably, there is a pair of rods, forming part of the scale-beam, on which the scale-weight slides, and the screw, placed between the rods, and tapped through the scale-weight, is journaled in a plate at the outer ends of these rods suitable collars being employed to prevent end motion. This end plate is preferably provided with a depending projection, which forms a stop to limit the descent of the scale-weight by contact with a small pillar on the machine-frame.

The third part of the invention consists in a shield for the scale-beam, which shield is supported by the machine-frame above the scale-beam, but below the package-support, which latter is upheld by a rod passing through a small hole in the shield. Heretofore the devices for protecting the knife-edges from the material weighed have been carried by the scale-beam.

The fourth part of the invention consists in the combination, with an automatic weighing-scale having a gate controlled by said scale for cutting off the supply when the scale is overbalanced, of a hopper and continuously-operating feeder for delivering the material in a steady stream and a collecting-chamber between the feeder and the gate of a size to contain loosely the material delivered during the time the gate ordinarily remains closed for replacing a full package with an empty one.

Preferably, the chamber is of frusto-conical form, the largest diameter being at the bottom, so that there is less danger of the material becoming clogged therein.

The fifth part of the invention consists in a special feeding mechanism designed particularly for feeding powdered substances, and in the combination of the same with an automatic weighing-machine of any ordinary or suitable construction, with or without an interposed collecting-chamber.

The main features of this mechanism are a hollow cone, or its equivalent, with perforated walls, set in the mouth of a hopper, and a feeder with screw-blades parallel with the walls of said cone, which feeder, being rotated in the proper direction, forces the material through the perforations in the cone. Preferably, these perforations have the edges beveled, so as the better to divide the material and cause it to enter the cone.

The foregoing improvements are designed to be used together in one improved machine; but they may also be employed separately, or some without the others.

The following is a description of the best mode to me known of applying the principle of the invention, reference being had to the accompanying drawings, which form part of this specification.

Figure 1 is a side elevation, partly in section, of an automatic weighing and package-filling machine constructed in accordance with the invention; and Figs. 2 to 10, detail views of different parts thereof. Fig. 11 is a view in sectional elevation, illustrating a modification also within the invention.

A is the hopper, which is supported by a standard, B, secured to a base, C. D is the package-support of the scale-pan. E is the scale-beam. F is the rod or arm carried thereby, on the upper end of which is the supply-gate G, and H is the delivery-spout. These parts, since they are or may be in all respects similar to corresponding parts described in the aforesaid patents, need no further description.

The mechanism for locking and releasing the supply-gate G is shown in Fig. 1. I is the lever or latch by which the said supply-gate is locked. $i'$ is the tooth formed thereon, and $f'$ is the pin carried by the rod or arm F, with which pin the said tooth $i'$ engages when the supply-gate is closed by the tilting of the scale-beam. The said lever or latch I is mounted and works on centers carried by a bracket, $i^2$, secured to the standard B, and is so balanced that when in its normal position its lower end bears against the rib $b'$ of the standard B, as shown in the drawings, the part on which the tooth $i'$ is formed being then in the path of motion of the said pin $f'$. The operating-finger or part of the said lever which is in proximity to the delivery-spout H is marked $i^3$. The action of this arrangement is as follows: When the scale descends and the supply-gate advances to close the delivery-spout, the pin $f'$ on the rod F lifts the upper arm of the lever I, and when the supply-gate has advanced far enough to fully close the delivery-spout the said pin $f'$ has passed under the notch $i'$ in the said lever I, which then falls, the said notch engaging with the said pin and preventing the accidental opening of the said supply-gate. When an empty package, bag, or case is about to be placed on the scale-pan, the mouth is placed over the spout H and the upper edge of the said package or case is pressed upward against the finger $i^3$ of the latch I, and raises it, thus disengaging the notch $i'$ from the pin $f'$ and liberating the rod or arm F and the scale-beam and parts carried by it. These consequently return to the positions shown in the drawings. The delivery-spout being then unobstructed, the matters contained in the hopper descend into the empty bag or case, which is immediately placed on the package-support D of the scale-pan. Said matters continue to descend and pass into the bag until the scale descends and the supply-gate is again closed and locked, as hereinbefore described.

The arrangement of the weight which balances the scale-pan and the matter to be weighed is shown in Figs. 1 and 2, of which the latter is a plan of the scale-beam and parts formed thereon or secured thereto, shown separately from the other parts of the machine, the rod or arm F being in section. J is the said weight. K are the rods on which it is mounted, which rods are secured at one end to the scale-beam and form a prolongation thereof.

L is the screw which passes through and engages with a screwed hole in the said weight, and $k'$ is the plate which connects the outer ends of the rods K. In a hole in this plate the screw L is mounted and rotates.

$l'$ is the collar secured to the said rod, by which it is prevented from moving endwise in the said bar.

$l^2$ is a milled head on the end of the screw L, which projects beyond the plate $k'$, by means of which milled head the said screw L is turned in one or other direction in order to adjust the position of the weight J relatively to the fulcrum of the scale-beam, according as the scale is required to turn with a lighter or heavier load. The upward motion of the scale-pan is limited by the contact of a projection, $K^2$, formed on the under side of the plate $k'$, with the upper end of a small pillar, M, secured to the base C of the machine.

The shield W for protecting the scale-beam is shown in Fig. 1 partly in section. It is secured by a flange, $w$, to the standard B, and has holes $w'$ and $w^2$, through which the rod $d$, for upholding the package-support D, and the rod F, for operating the supply-gate, pass. The shield is made hollow, so as to cover the scale at the sides as well as on top, and the upper surface is convex to allow the material to slide off; but the form of the shield may be changed.

The feeding mechanism, or the arrangement for insuring regularity in the passage or discharge from the hopper of powdered or granular matters, is shown in said Fig. 1 and in Figs. 3, 4, 5, 6, 7, 8, 9, and 10, which latter are drawn to a larger scale than Fig. 1.

N is the collecting-chamber, formed below the hopper and feeder and above the delivery-spout and supply-gate. The said chamber consists of a tube of frusto-conical form, having a flange, $n'$, formed at its enlarged lower end, by which it is secured to the upper part of the arm $b^2$ of the standard B, and having a conical flange, $n^2$, formed at its upper end, to which the hopper A is secured.

O is a hollow cone in the mouth of hopper A above the chamber. N and $o'$ are the inclined openings therein. The form of the part O is clearly shown in Figs 3, 4, 5, and 6, Fig. 3 being a central vertical section of the chamber N and of the cone O, and of a portion of the hopper A, Figs. 4 and 5, respectively, a plan and an elevation of the said part O, shown separately, and Fig. 6 a section thereof taken on the line X, Fig. 5.

P is the rotary shaft, mounted above the hopper A in bearings Q.

R is the feeder, which is secured to the lower part of the said shaft, and has screw-like vanes or arms $r'$ working in the hopper A in proximity to the cone O. The form of the feeder is clearly shown in Figs. 7, 8, 9, and 10, which are separate views thereof, Fig. 7 being a plan, Figs. 8 and 9 elevations taken at right angles to each other, and Fig. 10 a section taken on the line Z, Fig. 7. A recess, $r^2$, is formed in the axis of the lower part of the body of the feeder, which recess fits over a cylindrical boss, $o^2$, formed on the cone O, on which boss the said feeder bears, the vanes or arms $r'$ of the said feeder being thus kept out of contact with the hopper A and cone O. By the rotation of the shaft P the screw-like vanes or arms $r'$ are caused to stir the matters in the hopper and to force them downward therein, and to discharge them through the openings $o'$ into the chamber N.

In using the machine the matters to be weighed are supplied to the hopper A at such a rate that the said hopper is kept constantly charged without overflowing, and the speed of rotation of the shaft P is so regulated, according to the speed of the machine, that the chamber N may be kept partly charged, and only partly charged, with the matter passing from the hopper.

As shown in Fig. 11, the screw-feeder R is replaced by another form of screw-feeder—namely, a spirally-twisted rod, S. It is designed for use with tea and other like materials.

It is evident that modifications can be made in details without departing from the spirit of the invention.

Having now explained the principle of the invention and the best mode to me known of applying that principle, I claim the following as my invention or discovery, namely:

1. The combination, with a weighing-scale, an upright rod connected with said scale at its lower end, and a supply-gate carried by the upper end of said rod for controlling automatically the delivery of material to said scale, of a pin on said rod and a latch pivoted to the machine-frame and arranged with its locking-tooth in the path of said pin near the end of its forward movement, so as to lock the scale with the supply-gate closed, substantially as described.

2. The combination, with the weighing-scale and delivery-spout of an automatic weighing-machine, said scale being provided with a package-support below said spout, of a locking-latch arranged to come into engagement and lock the scale when the latter is overbalanced, and provided with a lifting-finger in proximity to said spout at a suitable height above said support to be out of contact with the package thereon, substantially as described.

3. The combination, with the delivery-spout, the weighing-scale provided with a package-support below said spout, the supply-gate, and the upright rod carrying the same, of the pin on said rod and the latch pivoted to the machine-frame and having its locking-tooth in the path of said pin near the end of its forward movement, said latch having a lifting-finger in proximity to said spout, substantially as described.

4. The combination, with the delivery-spout, the beam, the scale-pan, and the delivery-controlling devices of an automatic weighing-machine, of a sliding scale-weight, the rods for supporting and the screw for adjusting the same, the plate connecting the ends of said rods and provided with a projection on the under side, and the pillar or stop under said projection for limiting the downward motion of the scale-beam, substantially as described.

5. The combination, with the weighing-scale provided with a package-support, the upright rod connected with said scale, the supply-gate carried by said rod, the standard, and the hopper at the upper end of said standard, of the shield provided with holes for respectively the said upright rod and the rod upholding the package-support and arranged between the package-support and the scale-beam, said shield being fastened at the rear end to said standard, so as to be supported thereby, substantially as described.

6. The combination, with an automatic weighing-scale having a supply-gate controlled by said scale, and a hopper, said supply-gate being between the hopper and the scale, so as to control delivery from the hopper to the scale, of a continuously-operating feeder and a collecting-chamber placed between the feeder and the gate, substantially as described.

7. The combination, with the hopper, feeder, and gate, of a collecting-chamber of frusto-conical form, the largest diameter at the bottom, placed between the said feeder and the said gate, the latter forming a removable bottom for said chamber, substantially as described.

8. The combination of a hopper, a screw-feeder, a collecting-chamber, a supply-gate placed at the base of said chamber and controlling the delivery of material therefrom, and a weighing-scale connected with said gate, substantially as described.

9. The feeding mechanism composed of a hopper, a hollow cone with perforated walls set in the mouth of said hopper, and a feeder with one or more screw-blades rotating around said cone, substantially as described.

10. The combination, with an automatic weighing-machine, of feeding mechanism composed of a hopper, a hollow cone with perforated walls set in the mouth of said hopper, and a feeder with one or more screw-blades rotating around said cone, substantially as described.

11. The combination, with the weighing-scale and the supply-gate controlled thereby, of the hopper, the collecting-chamber below said hopper, the hollow cone with perforated walls set in the mouth of said hopper, and the screw-feeder rotating around said cone, substantially as described.

In testimony whereof I have signed this specification in the presence of two witnesses.

CLEMENT COLERIDGE CLAWSON.

Witnesses:
ALEX. WILEY,
FRED R. STAATS.